Feb. 13, 1940. W. F. MILLER Re. 21,350

HEATING SYSTEM

Original Filed July 10, 1935

Inventor

W. F. Miller,

By Emery, Booth, Holcombe & Miller

His Attorneys

Reissued Feb. 13, 1940 Re. 21,350

UNITED STATES PATENT OFFICE 21,350

HEATING SYSTEM

William F. Miller, Evansville, Ind., assignor to Industrial Engineering Corporation, Evansville, Ind., a corporation Original No. 2,077,250, dated April 13, 1937, Serial No. 30,675, July 10, 1935. Application for reissue August 4, 1937, Serial No. 157,430

4 Claims. (Cl. 236—46)

The present invention relates to heating systems and more particularly to automatically controlled heating systems and aims generally to improve existing systems of that type.

Heretofore, automatically controlled heating systems, particularly those designed for dwellings and the like, are controlled by a room thermostat operative to operate the heating unit periodically when the temperature in the room in which the thermostat is located drops to a certain point. Usually the thermostat is set to operate the heating unit when the room temperature drops to 70°.

It is well known that such operation of the heating unit, especially in colder climates, results in strata of cold air through the house, particularly adjacent the floor. This is because the water in the boiler and heating system, in the case of a hot water system, cools off as the rooms cool off, and when the room thermostat again operates the heating unit, a considerable delay occurs before the boiler temperature is raised sufficiently to heat the rooms. The room thermostat is usually placed on the wall about five feet above the floor, this being referred to as the breathing line.

According to my invention, I provide means for operating the heating unit at regular intervals of time, and for regular, variable adjustable durations of time to maintain the boiler temperature sufficiently high to avoid cold air stratification. This means may and preferably does operate independently of the room thermostat but is subject to the furnace limit control device or switch to prevent operation of the furnace when the temperature thereof reaches a predetermined degree.

Figure 1:
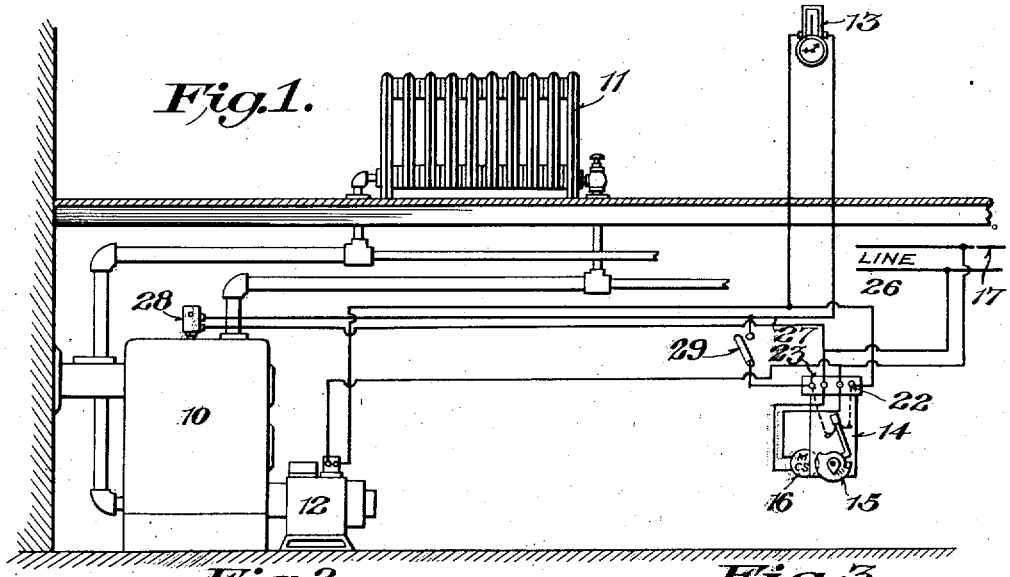
Figure 2:
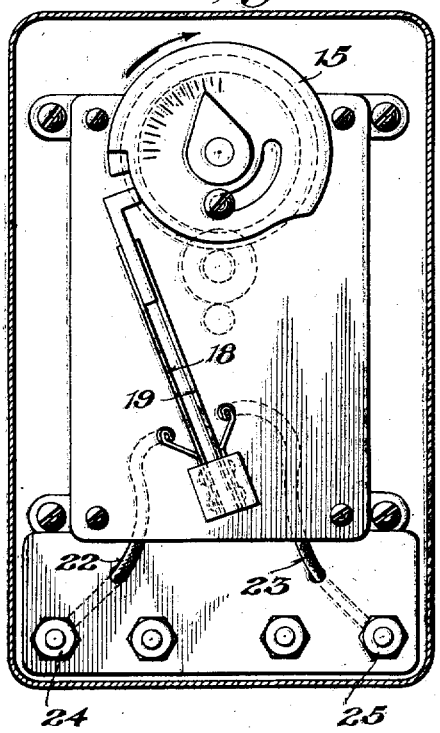
Figure 3:
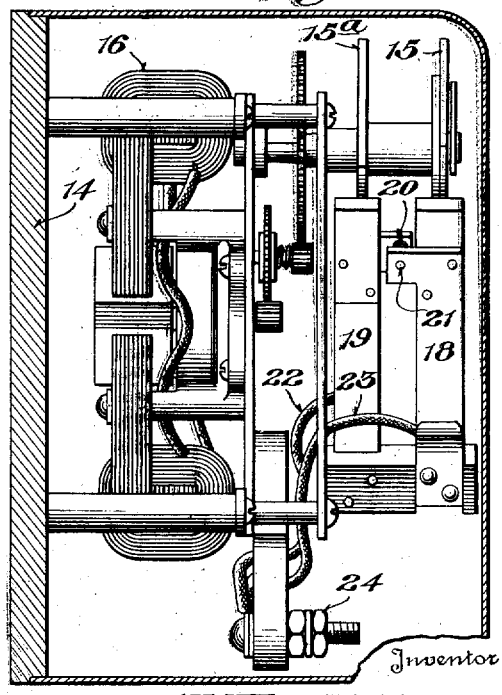

In order better to illustrate the invention, reference is had to the accompanying drawing, wherein Fig. 1 shows a satisfactory arrangement illustrated as applied to a hot water heating system having an electrically controlled oil or gas burner;

Fig. 2 is a front elevation of one suitable time controlled switch for use in the system illustrated in Fig. 1; and Fig. 3 is an edge view thereof.

According to the illustrated embodiment of the invention, the heating system may include a suitable furnace 10, herein illustrated as of the hot water type adapted to heat and circulate heated water to the radiators 11 located in the rooms throughout the building. The furnace may be heated by any well known means, as for example, coal, oil or gas, controlled by an electrically controlled heating unit generally designated at 12. The system may include the usual room thermostat 13 operative to control the heating unit 12 subject to the room temperature, as is the usual practice.

To avoid cold air stratification, I provide means for operating the heating unit 12 at regular predetermined intervals of time and throughout regular periods of duration, such means being operative independently of control by the room thermostat 13. Preferably the means may take the form of time controlled switch 14 of the type disclosed in my copending application Serial No. 30,674, of even date herewith. One satisfactory form of time controlled switch illustrated in Figs. 2 and 3 may comprise a rotatable cam 15 driven by a constant speed synchronous electric motor 16 receiving electrical energy from the conventional power line 17, the speed of the cam being reduced so that it will make one revolution every 15 or 30 minutes as desired. A plurality of relatively movable switch arms 18—19 are mounted upon a panel of the time controlled switch 14 and have their free ends engaging the cam 15, said arms carrying contacts 20—21 connected by wires 22—23 to terminals 24—25 respectively.

The cam 15 may comprise two cam disks 15 and 15ª one for each of the switch arms 18 and 19 respectively, and these disks may be relatively adjustable so as to variably regulate the duration of time the switch arms are closed during each revolution of the cam 15. As will be apparent from a consideration of Figs. 2 and 3, rotation of the cam disks 15 and 15ª in the direction of the arrow will maintain the switch arms 18—19 apart and the circuit broken except when the arm 18 rides off of the shoulder of the cam 15 and until the arm 19 rides off of the shoulder of the cam 15ª. This duration is controlled by the relative positions of the cam shoulders, see Fig. 2, and may be variably adjusted by adjusting the disk 15 relatively to the disk 15ª. Thus, during each rotation of the cams 15—15ª the switch arms may be in contact to close the circuit for a period of from 1 to 7 minutes, as may be desired, depending upon the adjusted position of the cams 15—15ª.

The switch arms 18—19 are connected through wires 22—23 and terminals 24—25 to lines 26—27 to the electrically operated heating unit 12, the line 26 leading through a furnace limit control switch 28 of the type that opens when the boiler reaches a predetermined temperature. Stated another way, the switch 28 only permits operation of the heating unit when the furnace is below a predetermined point at which the limit switch is set. Such switches are well known and are not illustrated in detail herein. Thus the time control switch is connected to the heating unit 12 in series with the limit control switch 28.

In operation the synchronous motor 16 is directly connected to the power lines 17 and operates continuously at a constant speed to rotate the cams 15—15ᵃ, one revolution in every 15 or 30 minutes as desired, and is controlled by the gearing of the switch 14. During each revolution the switch arms are closed to close the circuit through the furnace limit control switch 28 to the electrically controlled heating unit 12 to operate the heating unit for a time of sufficient duration to maintain the room temperature sufficiently high to avoid strata of cold air. This duration of periodic burner operation may be variably adjusted for 1 to 7 minutes as desired, by the simple relative adjustment of the cams 15—15ᵃ. Should, however for any reason, the time control switch fail to operate or become inoperative in the "on" position, the furnace control switch 28 will act as a safety to prevent overheating of the boiler, and consequent serious damage to the system. A switch 29 may be interposed in the circuit between the switch 14 and the heating unit 12 to cut out the switch 14 during mild weather. Under these conditions the heating unit will only be operated subject to the control of the room thermostat.

It will be observed that the room thermostat 13 is connected in parallel to the time switch 14 and hence the latter will operate independently of the former. However, in extremely cold weather it may be necessary to have the heating unit operated continuously for longer periods of time than provided by the time switch to maintain the desired room temperature, in which case the room thermostat will close the circuit to the electrically controlled heating unit 12.

My improved heating system not only heats a building more uniformly by avoiding cold air stratification but does so with an economy of fuel, because it requires from one third to one fifth the effort and hence of fuel to maintain the boiler or furnace temperature by periodic operation, than to raise it from a relatively cold state as is the case when the system is subjected to relatively long "off" periods.

Actual usage of my improved system proves not only an economy in fuel but an actual increase of the room temperature at the baseboard line of approximately four degrees without increase of the temperature at the breathing line.

This patent is a continuation in part of my prior copending application Serial No. 700,629, filed December 1, 1933.

It is to be clearly understood that the above description and accompanying drawing describing my invention as applied to hot water heating systems is intended for illustrative purposes only. Obviously the invention is applicable to hot air, steam, vapor and other systems and the heating unit may obviously be of any type adapted to burn coal, oil, gas or other fuel. Also the system may be of the three wire type and obviously may be either a low voltage or high voltage system without departing from the spirit of the invention.

I claim:

1. In a heating system, in combination with an electrically operated furnace and a heat distributing radiator located in the room to be heated and connected with said furnace, a single electric circuit for controlling the operation of said furnace, a furnace thermostat and a room thermostat in series with the control circuit, a time controlled switch connected in parallel solely with the room thermostat for closing said furnace circuit at frequent regular intervals of time and throughout definite variably adjustable predetermined durations, the frequency of periodic furnace operation being at substantially 15 minute intervals, and the duration thereof being variably adjusted from 1–7 minutes to intermittently supply heat to the radiator synchronously with said periodic furnace operation so as to substantially increase the baseboard temperature of the room without substantially increasing the temperature at the breathing line.

2. In a heating system, in combination with an electrically operated furnace and a heat distributing device located in the room to be heated and connected with said furnace, a single electric circuit for controlling the operation of said furnace, a furnace thermostat and a room thermostat in series with the control circuit, a time controlled switch connected in parallel solely with the room thermostat for closing said furnace circuit at frequent regular intervals of time and throughout definite variably adjustable predetermined durations independently of the room temperature, the frequency and duration of such periodic operation being such as to intermittently supply heat to the radiator at such frequent intervals in synchronism with said predetermined furnace operation to maintain heat therein so as to substantially increase the baseboard temperature of the room without substantially increasing the temperature at the breathing line.

3. In a heating system, in combination with an electrically operated fluent fuel furnace and a heat distributing radiator located in the room to be heated and connected with said furnace, a single electric circuit for controlling the operation of said furnace, a furnace thermostat and a room thermostat in series with the control circuit, a time controlled switch connected in parallel solely with the room thermostat for closing said furnace circut at frequent regular intervals of time and throughout definite variably adjustable predetermined durations, the frequency of furnace operation being in the order of one per 15 minutes and the duration thereof being variably adjusted from 1 to 7 minutes to intermittently supply heat to the radiator in synchronism with said periodic furnace operation so as to substantially increase the baseboard temperature of the room without substantially increasing the temperature at the breathing line.

4. In a heating system, in combination with an electrically controlled furnace and a heat distributing device located in the room to be heated and connected with said furnace, a furnace thermostat and a room thermostat in series with the control circuit; of a single electric circuit for controlling said furnace, a time controlled switch connected in parallel solely to said room thermostat for operating said furnace at approximately fifteen minute intervals and throughout definite variably adjustable durations of time of substantially 1 to 7 minutes duration, said time switch being operable to operate said furnace throughout said frequent, definite, variably adjusted durations independently of the room temperature requirements to maintain a substantial heat in said furnace and intermittently supply heat to said distributing device synchronously with said periodic furnace operation, and means for rendering said time controlled switch inoperative during mild weather in order that said furnace may be controlled solely by room and furnace thermostats.

WILLIAM F. MILLER.